July 14, 1936.  H. E. TWOMLEY  2,047,840
SPEED CHANGING DEVICE
Filed Feb. 25, 1935  6 Sheets-Sheet 1

Inventor
Herbert E. Twomley
By Lyon & Lyon
Attorneys

July 14, 1936.  H. E. TWOMLEY  2,047,840
SPEED CHANGING DEVICE
Filed Feb. 25, 1935   6 Sheets-Sheet 2

Inventor
Herbert E. Twomley
By Lyon & Lyon
Attorneys

July 14, 1936.  H. E. TWOMLEY  2,047,840
SPEED CHANGING DEVICE
Filed Feb. 25, 1935  6 Sheets-Sheet 3

Inventor
Herbert E. Twomley
By Lyon & Lyon
Attorneys

July 14, 1936.  H. E. TWOMLEY  2,047,840
SPEED CHANGING DEVICE
Filed Feb. 25, 1935  6 Sheets-Sheet 4

Fig. 9.

INVENTOR.
Herbert E. Twomley
BY Lyon & Lyon
ATTORNEYS

July 14, 1936.  H. E. TWOMLEY  2,047,840
SPEED CHANGING DEVICE
Filed Feb. 25, 1935   6 Sheets-Sheet 5

Inventor
Herbert E. Twomley
By Lyon & Lyon
Attorneys

July 14, 1936. H. E. TWOMLEY 2,047,840
SPEED CHANGING DEVICE
Filed Feb. 25, 1935 6 Sheets-Sheet 6

INVENTOR.
Herbert E. Twomley
BY Lyon & Lyon
ATTORNEYS

Patented July 14, 1936

2,047,840

UNITED STATES PATENT OFFICE 2,047,840

SPEED CHANGING DEVICE

Herbert E. Twomley, Riverside, Calif.

Application February 25, 1935, Serial No. 7,956

6 Claims. (Cl. 74—286)

My invention relates to speed-changing devices and has particular reference to a power transmission system in which a driven shaft may be coupled to a prime mover to operate at a speed different from the speed of the prime mover.

In power transmission systems wherein a prime mover, such as a motor or other rotary device is employed to drive a driven shaft, the driven shaft may be connected to the prime mover by means of gears, pulleys, belts and the like to operate at a different speed from that of the prime mover. However, all such systems which have been employed require the interposition of pulleys of various sizes, or gears of various sizes and ratios, in order to produce the desired speed of the driven member from a given speed of the prime mover, and where the difference in speed between the driven member and the prime mover is relatively great the ratio of gearing or the belting which is required consumes a relatively large space, and further requires considerable complication in their construction.

For example, if a motor is designed to operate at a speed of 1800 R. P. M. and it is desired to drive a shaft therefrom at the rate of 10 R. P. M., the gearing which is required between the motor and the driven shaft must be relatively large and occupy a great space relative to the size of the motor which is employed to drive the same.

It is an object of my invention to provide a speed-changing system in which substantially any speed ratio between the driven shaft and the prime mover or driving member may be attained by means of power transmitting devices which are relatively small compared with the size of the motor or the prime mover.

Another object of my invention is to provide a speed-changing system of the character set forth in the preceding paragraphs in which a speed-changing system for producing one speed ratio may be altered to produce a different speed ratio without changing the overall size of the transmission system.

Another object of my invention is to provide a speed-changing system in which relatively great differences in speed between the driving member and the driven member may be attained by employing a compact differential type gearing.

Another object of the invention is to provide a compact differential gear system which may be employed in the power transmission system wherein the speed ratio between a driving member and a driven member may be altered by relatively small changes in the diameter of gears or pulleys employed in the same.

Another object of the invention is to provide a variable speed-changing system in which variations of speed ratios between a driving member and a driven member may be attained by a relatively small alteration in the size of gears or pulleys employed in the system.

Another object of the invention is to provide a transmission system for producing relatively great differences between the speed of a driving member and the speed of a driven member in which two driven gears or pulleys are coupled to the driving member to operate in different directions, and in which the two driven members or pulleys are coupled to the driven shaft by means of differential gearing.

Other objects and advantages will be apparent from a study of the following specifications, read in connection with the accompanying drawings, wherein.

By referring to the drawings, it will be noted that I have illustrated my speed-changing system as employed for the purpose of transmitting power to a driven shaft directly from a motor, though it will be understood by those skilled in the art that my speed-changing system is equally well adapted to be interposed between any driven shaft and any driving shaft.

Figure 4:
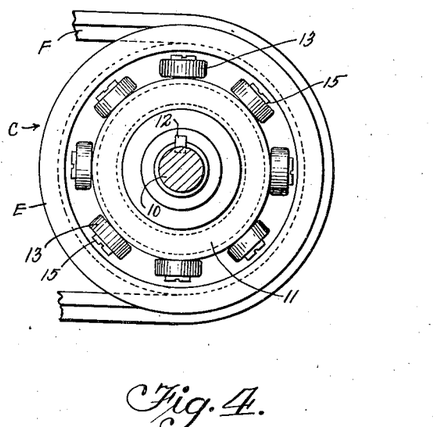
Fig. 4 is a detail sectional view, taken along line IV—IV of Fig. 2.
Figure 5:
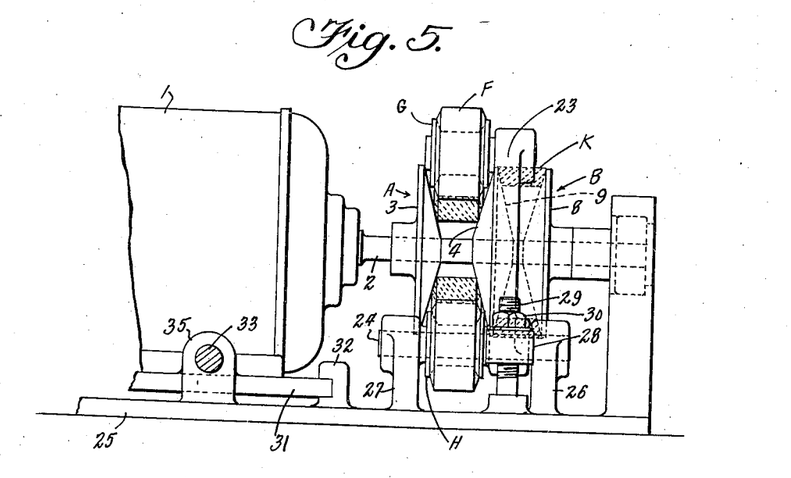
Fig. 5 is a side elevational view of the motor and pulleys shown in Fig. 1.
Figure 6:
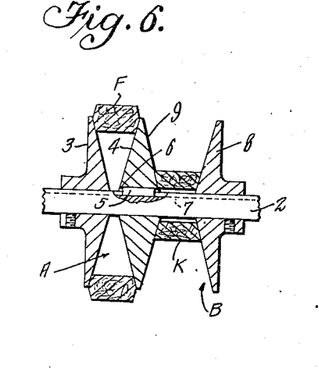
Figs. 6 and 7 are detail sectional views, of the motor and pulleys shown in Figs. 1, 2 and 5, illustrating the manner in which the speed of the driven shaft may be variably controlled.
Figure 7:
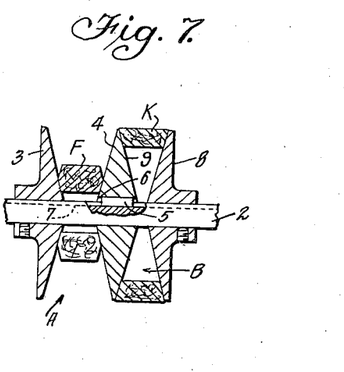

In the embodiment of the invention shown in Figs. 1 through 7, I have illustrated a motor 1 having a shaft 2 rotated thereby. The shaft 2 has secured thereto two pulleys designated by the reference characters A and B, each of the pulleys being formed of a pair of discs, the pulley A being formed of a disc 3 fixed to the shaft 2 and a movable disc 4 connected as shown in Figs. 6 and 7 to be rotated by the shaft 2 but slidable thereon, as by means of a key 5 engaging a slot 6 in the disc 4, and also engaging a slot 7 in the shaft 2. In like manner the pulley B is formed of a fixed disc 8 secured in fixed relation upon the shaft 2 and a second disc 9 slidable relative to the shaft 2. In the embodiment of the invention illustrated in Figs. 1 through 7, the disc 9, for the pulley B and the disc 4 for the pulley A, are formed integrally with each other so that sliding movement of the disc members 4—9 will widen the pulley B and narrow the pulley A, or vice-versa, thus adapting the pulleys A and B to a variable speed drive permitting change in the effective diameters of the pulleys A and B by sliding the disc members 4—9 along the shaft 2, as will be hereinafter more fully described.

The motor shaft 2 is illustrated as driving a driven shaft 10 to which the motor and pulleys are connected through a differential driving element designated generally by the reference character C.

The differential driving element consists, essentially, in a pair of rotary members mounted upon the shaft 10 in spaced relation to each other and freely rotatable on the shaft with a driven member interposed between the two rotary members having one or more rollers or gears or other power-transmitting devices carried by the driven member to engage both of the rotary members to be driven in the manner of planetary gears, or so-called "sun-gears". The rollers referred to may take the form of friction rollers, as indicated in Figs. 1 through 11, or may take the form of beveled gears, or spur gears, as shown in Figs. 12 and 13, so that wherever reference is made herein to "rollers" it should be understood that this term includes any rolling member which may be employed to interengage the two rotary members of the differential or planetary gear unit.

Figure 3:
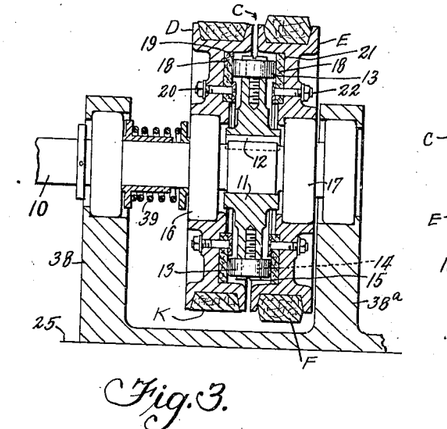
Fig. 3 is a vertical sectional view taken along line III—III of Fig. 2.

By referring particularly to Figs. 3 and 4 it will be observed that the driven shaft 10 is rigidly secured to a spider 11, (constituting the driven member of the differential unit), as by means of a key 12, the spider 11 extending radially a considerable distance away from the axis of rotation of the shaft 10 and having rotatably mounted upon its periphery a plurality of rollers 13 (constituting planetary gears) spaced evenly about the periphery of the spider 11. The rollers 13 are each mounted upon individual shafts 14 extending radially relative to the axis of rotation of the shaft 10 so that the axis of rotation of the rollers 13 is at right angles to the axis of rotation of the shaft 10. The rollers 13 may be secured upon their shafts 14 in any suitable manner, as by means of screws or bolts 15.

A pair of rotary members are illustrated as being mounted upon the shaft 10, these rotary members in the embodiment shown herein constituting pulleys D and E mounted on the shaft 10 on opposite sides of the spider 11, each of these pulleys D and E being freely rotatable about the shaft 10, and I prefer to interpose ball bearings of the radial and thrust type 16 and 17 between the shaft 10 and the pulleys D and E, respectively. The inner surfaces of the pulleys D and E are adapted to engage the peripheral surfaces of the rollers 13, which engagement, in the modification shown in Figs. 1 through 11, is a frictional engagement which may be a direct frictional engagement between the material of which the pulleys D and E are constructed with the material of which the rollers 13 are constructed, though I prefer to form the pulleys D and E of relatively strong metal which will engage friction surfaces on the rollers 13, or I may line the inner surfaces of the pulleys D and E with suitable friction material 18, such as leather, rubber, or any of the well-known surfacing materials employed in ordinary friction gear drive systems. Perhaps the simplest construction is that shown in Fig. 3, wherein the friction material 18 is formed as a washer or flat annulus of the friction material set into a recess 19 and held against movement relative to the pulley D as by means of bolts 20. Similarly the friction material 18 for the pulley E may be constructed as a washer set into a recess 21 thereon and held in place by means of bolts 22. Thus the periphery of each of the rollers 13 will be engaged on diametrically opposite sides by the inner surfaces of pulleys D and E, respectively.

From an inspection of Figs. 3 and 4, it will be observed that the pulleys D and E, the spider 11, the rollers 13, and the shaft 10 constitute a differential gear in which the two pulleys D and E are the driving elements engaging the rollers 13 of the driven element, namely, the spider. Thus if the pulleys D and E are rotated in opposite directions relative to each other and if the speed of rotation of the pulley D exactly equals the speed of rotation of the pulley E, the rollers 13 will be spun around their shafts 14 without causing any rotation of the spider 11. However, if the pulley D is driven at any speed different from the speed at which the pulley E is driven, the roller 13 will be driven by one of the pulleys D—E at a greater speed than by the opposite pulley and hence the spider will be rotated, driving the shaft 10 at a speed determined by the difference in speed between the pulleys D and E. Thus by increasing the difference between the speed of rotation of the pulleys D and E, the speed of rotation of the shaft 10 will be proportionately increased. For example, if the speed of the pulleys D and E in opposite directions is just equal to each other, the resultant drive of the shaft 10 will be zero, while if the speed of the pulleys D and E differ, the resultant driving speed of the shaft 10 will be equal to one-half of the difference between the speed of D and the speed of E. Thus, if the pulley D is driven at 500 R. P. M. and the pulley E is driven at 100 R. P. M., the resulting speed of the shaft 10 will be 200 revolutions per minute, or one-half of the difference between 500 and 100.

For any ratio of speed of the pulleys D and E, the formula $$\frac{x-y}{2}$$

may be employed to determine the driven speed of the shaft 10, when $x$=speed of D and $y$=speed of the pulley E.

Again, for example, if an extremely low speed is desired for the shaft 10, the difference in speed of operation of the pulleys D and E must be relatively small. Thus if the pulley D is driven at 500 R. P. M., while the pulley E is driven at 499 R. P. M. the resulting speed of the driven shaft 10 will be one-half R. P. M.

By coupling the pulleys D and E to the motor 1 to be driven by the motor 1 in an opposite direction and at a difference in speed, any desired ratio between the speed of the motor shaft 2 and the driven shaft 10 may be accomplished.

In the embodiment of the invention shown in Figs. 1 through 7, the pulleys D and E are illustrated as fixed diameter pulleys and are also illustrated as being pulleys of the same diameter. It will be apparent that by coupling the pulley D to the motor shaft 2 by a pulley of different diameter, a difference in speed of rotation of the pulleys D and E will be attained.

In the embodiment of my invention illustrated in Figs. 1 through 7, I have shown a variable speed drive for the shaft 10, in which the pulleys A and B of the motor shaft are arranged by reason of their disc construction to vary their effective diameters.

The pulley A is illustrated as being connected to the pulley E by means of a belt F, illustrated as a double V belt; that is, the cross section of the belt F is formed as a portion of a V-shape extending in both directions from the center of the belt. The belt F is illustrated as being trained over an idler pulley G, then over the motor pulley A, and then over a second idler pulley H, and then over the pulley E. The motor pulley B is coupled to the pulley D by means of a belt K which in this instance extends directly from the pulley D over the pulley B and back over the pulley D. By this coupling arrangement the rotation of the motor shaft 2 in a clockwise direction will drive the pulley D in a clockwise direction and will drive the pulley E in a counter-clockwise direction.

Figure 1:
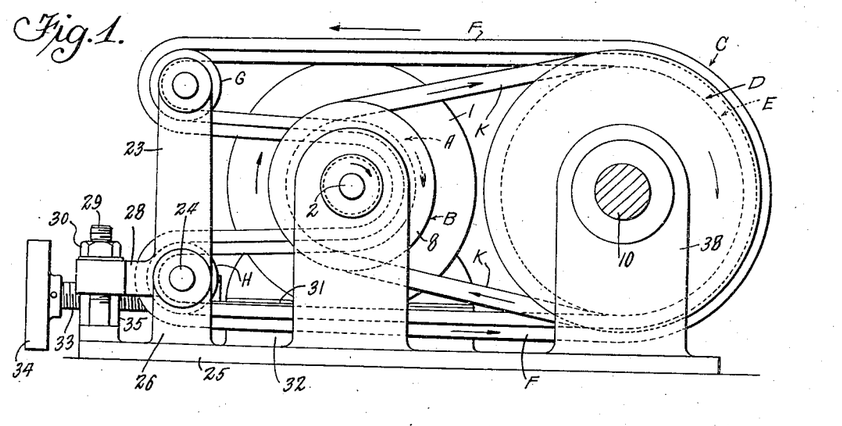
Figure 1 is a vertical elevational view of a motor and driven shaft coupled together by means of a transmission system constructed in accordance with my invention.
Figure 2:
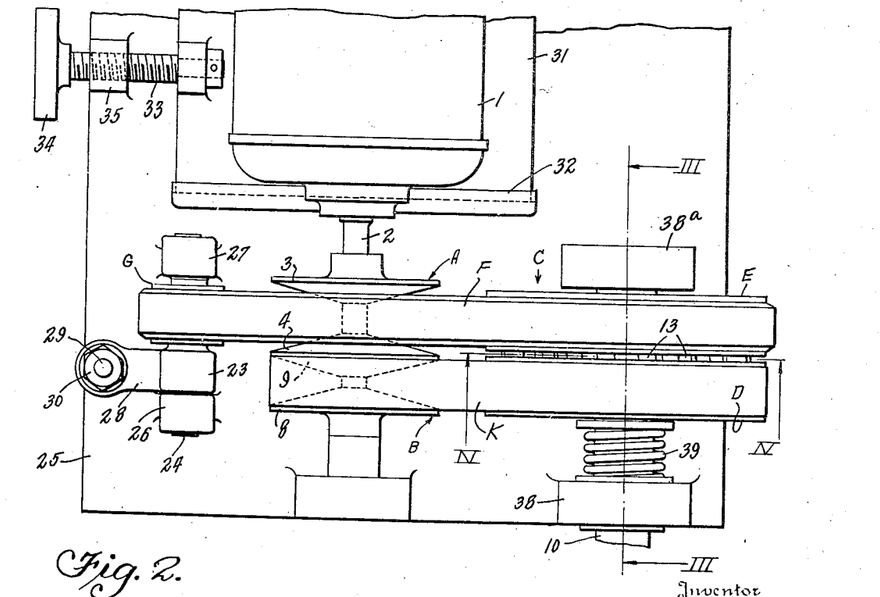
Fig. 2 is a plan view of the motor, driven shaft and transmission system shown in Fig. 1.

By referring particularly to Figs. 1 and 2 and 5 it will be observed that the idler pulley G is mounted at the upper end of an upstanding bar or bearing support 23, which bar forms one leg of a bellcrank pivoted upon a stub shaft 24 mounted upon a suitable base 25 by means of upstanding bearing members 26 and 27.

It will also be observed by those skilled in the art that the idler pulley H is mounted upon the same stub shaft 24 upon which the bellcrank bearing support 23 is mounted. It will also be observed that the motor 1 is secured upon a slide plate 31 supported in slide bearings 32 upon the base 25 so that the motor may be moved toward and away from the shaft 10 by means of an adjusting screw 33 having a handwheel 34 secured thereto, it being understood that the screw 33 is threaded through an upstanding lug 35 on the base 25 and is engaged with the slide plate 31 in such manner that rotation of the handwheel 34 in one direction will move the motor 1 toward the driven shaft 10, while movement of the handwheel 34 in the opposite direction will move the motor away from the driven shaft 10.

By reason of the disc construction of the pulleys A and B with their integral sliding disc 4—9, movement of the motor toward the driven shaft 10 will tighten the belt F and loosen the belt K, thus causing the belt F to slide the disc 4—9 toward the disc 8, reducing the effective diameter of the pulley A and increasing the effective diameter of the pulley B, as is shown in Fig. 7, while reverse movement of the motor will tighten the belt K and loosen the belt F, reversing the relative effective diameters of the pulleys A and B, as is shown in Fig. 6.

With the construction illustrated in Figs. 1 through 7, the adjustment of the motor 1 relative to the driven shaft 10 to cause the effective diameters of the pulleys A and B to be equal to each other will drive the pulleys D and E at the same speed, but in the opposite directions, and the driven shaft 10 will, therefore, not be rotated. Movement of the motor 1 from this position toward the driven shaft 10 will cause the pulley E to be driven at a lesser speed than the pulley D, and by reason of the differential action of the pulleys D and E on the rollers 13, the driven shaft 10 will rotate in a clockwise direction at one-half of the difference between the speed of the pulley D and the pulley E. On the other hand, should the motor 1 be moved from its original position—(with the diameters of the pulleys A and B equal)—away from the driven shaft 10, the pulley D will be rotated at a lesser speed than the pulley E, and the driven shaft 10 will therefore operate in a counter-clockwise direction at a speed equal to one-half the difference between the speeds of the pulleys D and E. It follows, therefore, that by suitably adjusting the position of the motor relative to the driven shaft 10 infinite variation in the speed of the driven shaft 10 may be accomplished.

While as illustrated herein the pulleys A and B are shown as of lesser maximum diameter than the diameter of the pulleys D and E, it will be apparent that by employing larger diameter pulleys in place of the pulleys A and B, the speed of the driven shaft 10 may be greater than the speed of the motor 2, if such stepped-up speed is desired. This brings out an important feature of my invention, in that the pulleys D and E, with the rollers 13 and spider 11, may be manufactured in a single, given size. In other words, the differential unit C may be constructed as a stock unit and is adapted for the production of any desired speed of operation for its shaft 10 by merely substituting pulleys of different diameters for the pulleys A and B. Thus with a single stock differential unit and a series of varying sizes of pulleys A and B for substitution upon the motor shaft 2, an inexpensive infinite variety of speed changes may be supplied with a minimum of parts necessary to accomplish such various speed ratios. The importance of this feature will be apparent by comparing the same with the present type of speed change systems, wherein it is necessary to substitute both the driving pulley and the driven pulley whenever a speed ratio differing from the original speed ratio of the original pulleys is desired. Again, in order to accomplish a relatively great change of speed between the motor and the driven shaft 10 with the present systems of transmission, it is necessary to use an extremely small diameter pulley on the motor 10 and an extremely large diameter pulley on the driven shaft 10, whereas with my system a relatively small diameter differential unit C on the shaft 10 may be coupled with a pulley set on the motor shaft 2 for substantially the same diameter as the pulley D, thereby insuring that sufficient traction will be provided for the belts K and F even though great speed reduction is desired. Present types of belting systems would require such small diameter pulleys on the motor shaft 2 as to reduce the amount of traction between such pulley and its belt to a negligible quantity.

By referring particularly to Figs. 1, 2, 3 and 5, it will be observed that the differential unit C is constructed to be mounted in upstanding bearing members 38 and 38a formed integrally with the base 25, though it will be understood by those skilled in the art that the bearing members 38, 38a may be formed upon a separate unit mounted upon the base 25 if desired. Also the illustration of the invention as shown in Figs. 1 through 7 indicates that the driven shaft 10 is parallel to the motor shaft 2, though it will also be understood by those skilled in the art that the driven shaft 10 may be disposed in any angular relation to the motor shaft 2 if desired and the belts K and F twisted to conform to the annular mounting of the shaft 10. Thus, though the motor 1 may be mounted with its axis horizontal, the shaft 10 may be mounted with its axis of rotation also in the horizontal direction but at any desired angle to the axis of rotation of the shaft 2.

The other leg 28 of the bellcrank 23 extends laterally of the shaft 24 and is connected by means of a bolt 29 to the base 25 so that by tightening or loosening the nut 30 on the bolt 29 the bellcrank 23 may be moved toward and away from the driven shaft 10 to thereby move the idler pulley G to tighten or loosen the belt F. The operation of the bellcrank 23 as indicated keeps the belt F tight at all times and insures sufficient traction between the pulley A and the pulley E, though if desired a compression spring may be interposed between the nut 30 and the leg 28 of the bellcrank 23 to exert a constant force thereon, tending to maintain the belt F in taut relation.

It will also be noted that the friction engagement between the pulleys D and E and the rollers 13 may be maintained at any desired value by mounting one of the pulleys D or E for sliding movement relative to the shaft 10 and relative to the other pulley D or E, as is shown particularly in Fig. 3, wherein the pulley D is mounted for sliding movement toward the pulley E and the frictional engagement between the pulleys D and E and the rollers 13 is maintained by means of a compression spring 39 interposed between the bearing member 38 and the ball bearings 16 on which the pulley D is mounted.

In the form of the invention shown in Figs. 1 to 7, the motor may be initially adjusted to produce a predetermined tautness upon the belt K and then by adjusting the nut and bolt 29, 30 the belt F may be adjusted to an equal tautness. When this adjustment is made, shifting of the motor 1, relative to the driven shaft 10, will not change the relative tautness of belts K and F but will merely change the relative effective diameters of the pulleys A and B.

Figure 8:
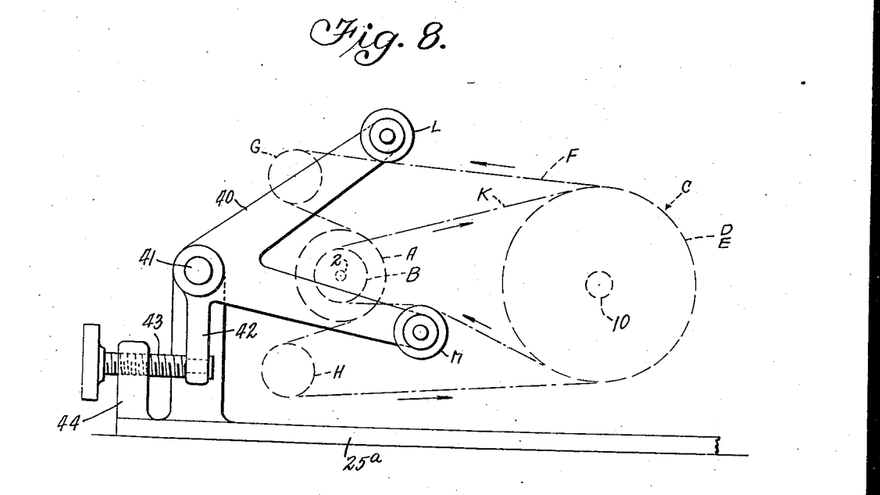
Fig. 8 is a detail, diagrammatic view of a modified form of belt-varying system which may be employed with the transmission system shown in Fig. 1, through Fig. 7.

As is shown, however, in Fig. 8, the effective diameters of the pulleys A and B may be varied by simultaneously tightening belt K and loosening belt F, or simultaneously loosening belt K and tightening belt F by a belt-shifting mechanism instead of shifting the relative position of the motor and the driven shaft 10. In the embodiment of the invention shown in Fig. 8, it is assumed that the driven shaft 10 and the motor shaft 2 are fixed relative to each other and that the belts K and F extend between pulleys D and B and pulleys E and A, respectively, belt F extending over idler pulleys G and H as described with reference to Figs. 1 to 7. In this instance, however, a second set of idler rollers or pulleys L and M are mounted upon a yoke 40 pivoted upon a shaft 41 secured to the base 25a upon which the motor 1 and the driven shaft 10 may be mounted. The yoke 41 is provided with a downwardly extending arm 42 engaged with an adjusting screw 43 threaded into an upstanding lug 44 rising from the base 25a. The mounting of the pulleys L and M is such that the pulley L engages above the belt F, while the pulley M engages below the belt K. Thus by moving the screw 43 toward the right, as viewed in Fig. 8, the belt K will be tightened, while the belt F is simultaneously loosened, thus reducing the effective diameter of the pulley A and increasing the effective diameter of the pulley B. Reverse movement of the screw 43 will, in like manner, tighten belt F and loosen belt K and reverse the relative diameters of the pulleys A and B and thus provide for varying the relative speed of operation of the pulleys D and E on the differential unit C.

Figure 9:
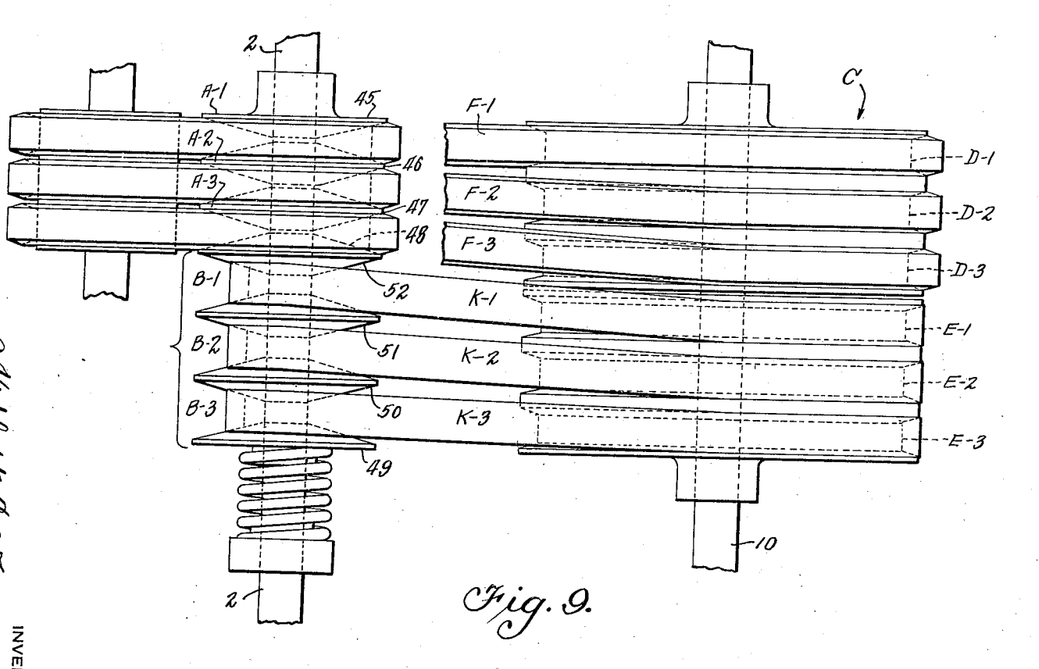
Fig. 9 is a detail plan view of a multiple pulley and belt drive which may be employed with the form of my invention shown in Figs. 1 through 7.

While in the embodiment of the invention shown in Figs. 1 through 7 it is assumed that but a single pulley D is used upon the differential unit C and a single pulley E is used upon the differential unit C, the transmission of relatively great amounts of power from a driving shaft to a driven shaft may be required and greater traction than will be provided by the single pulley and the single belt arrangement shown therein. My system, however, is equally well adapted to a multiple belt drive, as is illustrated particularly in Fig. 9, wherein the motor shaft 2 is illustrated as being provided with a set of belts corresponding to the pulleys A and B shown in Figs. 1 to 7. In this instance, however, three pulleys, A1, A2 and A3 are employed as a substitute for the single pulley A, while similarly pulleys B1, B2 and B3 are substituted for the single pulley B. The pulleys A1, A2 and A3 may be formed of a single fixed disc 45 and a plurality of slidable discs 46, 47 and 48. Similarly, pulleys B1, B2 and B3 may be constructed of a single fixed disc 49 and slidable discs 50, 51 and 52, again the disc 52 constituting one end of the pulley system B1, B2 and B3 which may be formed integrally with the disc 48 constituting the end disc of the pulley set A1, A2 and A3, so that by tightening the belts F1, F2, and F3, passing over the pulley set A1, A2 and A3, and loosening belts K1, K2, and K3, passing over the pulley set B1, B2, and B3, will slide all of the slidable discs 46, 47, 48, 52, 51 and 50 to the right as viewed in Fig. 9, while tightening belts K1, K2, and K3, and loosening belts F1, F2, and F3, will cause the slidable discs to move toward the left, thus varying the effective diameters of the pulley set B1, B2 and B3 relative to the pulley set A1, A2 and A3. The single pulley D of the differential unit C is illustrated in Fig. 9 as having been substituted for by three pulleys D1, D2 and D3 which may be readily formed by merely providing three belt grooves in a wide-faced single pulley substituted for the narrow pulley D. Similarly, the three pulleys E1, E2 and E3 are substituted for the single pulley E. Again such construction may be in the form of three belt grooves formed in a single wide-faced pulley substituted for pulley E. Internal mechanism, including rollers 13, spider 11 and its connection to shaft 10 may be identical with that described with reference to Figs. 1 through 7. Also it will be noted that the tightening and loosening of belts F1, F2 and F3, and K1, K2 and K3, may be accomplished either by shifting the motor relative to the shaft 10 or by employing a belt tightening and loosening system as shown in Fig. 8.

While thus far my invention has been described with reference to a variable speed transmission system employing the operable diameter grooved pulleys employing the belts, my transmission system is equally applicable to conditions under which it is desired to provide a constant speed drive for the driven shaft 10 but at a different speed from the speed of the motor or other driving shaft.

Figure 10:
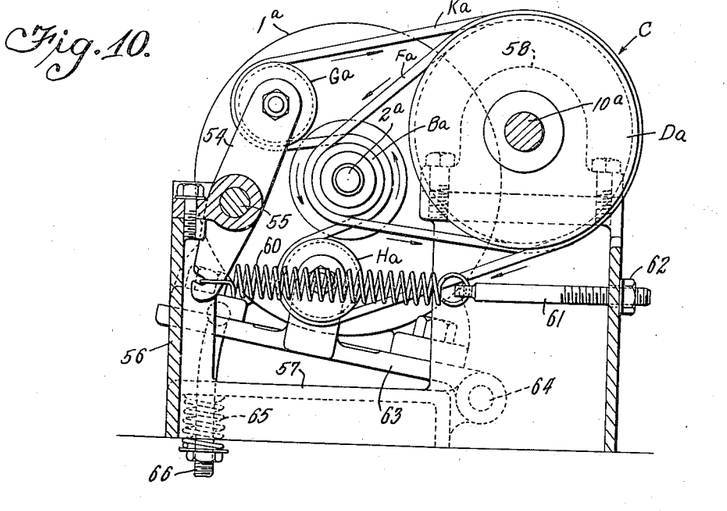
Fig. 10 is an end elevational view of a modified speed-changing system embodying my invention.
Figure 11:
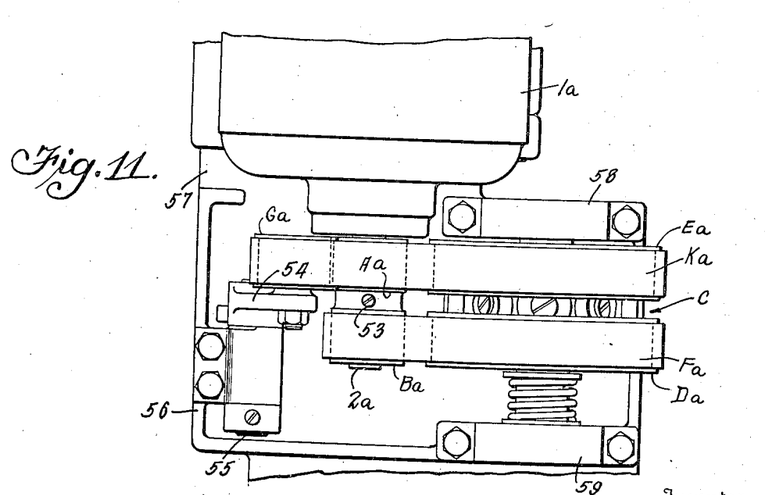
Fig. 11 is a plan view of the modified system shown in Fig. 10.
Figures 12, 13, 14:
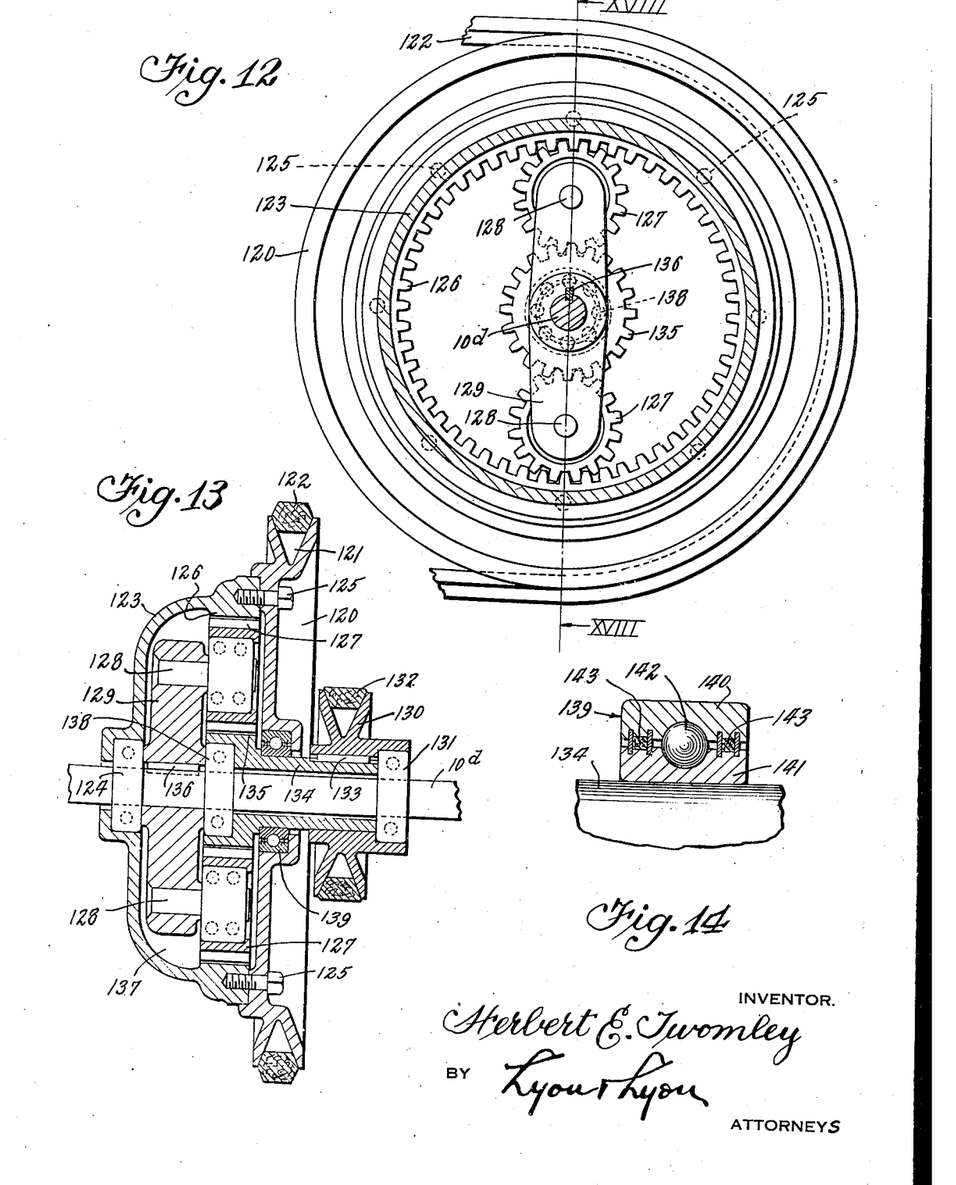
Fig. 12 is a front elevation, partly in section, of a modified form of differential unit which may be used in carrying out my invention, and illustrating the adaptation thereof to a planetary gear type of differential.
Fig. 13 is a vertical sectional view, taken along line XIII—XIII of Fig. 12.
Fig. 14 is a detail view of a bearing which may be employed with the form of my invention illustrated in Figs. 12 and 13.

By referring particularly to Figs. 10 and 11, it will be noted that I have embodied in my transmission system employing the differential unit C as a speed-reducing transmission system applicable to a constant speed, a motor 1a for driving a shaft 10a at a constant speed. In this embodiment of my invention the motor 1a has its shaft 2a provided with a pair of pulleys Aa, Ba, over which operate respectively belts Ka and Fa. In this embodiment of the invention the belts Ka and Fa are shown as relatively wide, flat belts which engage relatively wide peripheral surfaces of the pulleys Aa and Ba. Similarly, the differential unit C is identical with the unit shown in Figs. 1 through 7 except that wide-faced pulleys Ea and Da have been substituted for the V-grooved pulleys D and E. The pulleys Aa and Ba will be formed with their diameters differing from each other by such amounts as will produce the desired difference in speed of the pulleys Ea and Da to achieve the necessary speed reduction for the shaft 10a. If desired the pulleys Ba and Aa may be formed as a single integral unit secured to the shaft 2a as by means of a set screw 53. Thus it will be observed that with a single stock differential unit C innumerable variations in the driven speed of the shaft 10a may be obtained by the mere substitution of pulleys for the pulleys Aa and Ba in which the relative diameters of these pulleys differ by different amounts. This permits a manufacturer to stock a quantity of the same size differential units C together with a quantity of different diameter pulleys Aa and Ba adaptable for substantially any speed ratio between the motor 1a and the driven shaft 10a. Again it will be noted that the diameter of the differential unit C may be maintained above relatively small limits and that substitution of varying diameter pulleys Aa and Ba may be made without requiring additional gearing or without requiring enlargement of the differential unit C. Thus a relatively small compass substantially infinite speed ratios may be obtained as distinguished from the systems now in use which require enlargement of the total size of a speed-changing unit as the speed ratio increased.

With the form of the invention shown in Figs. 10 and 11 the belt Ka, like the belt K, is drawn over a pair of idler pulleys Ga and Ha in order to permit rotation of the motor shaft 2a in the same direction to drive the differential unit pulleys Ea and Da in opposite directions. The support or mounting for the pulley Ga, comprising a lever 54 pivoted upon a suitable stub shaft 55 mounted in an upstanding bracket 56 extending from the base 57, upon which the motor 1a is mounted and also upon which the bearing members 58 and 59 for the driven shaft 10a are mounted. One end of the lever 54 may be connected by a suitable spring 60 to an adjusting screw 61 having a nut 62 thereon which may be tightened or loosened to vary the tension on the lever 54 to thereby hold the belt Ka tight at all times.

In order to insure that the belt Da may also be maintained in taut relation upon its pulleys, the motor 1a may be mounted upon a secondary base plate 63 pivoted to the base 57, as indicated at 64, with a spring 65 secured to an eye-bolt 66 normally urging the motor base plate 63 toward the base 57.

Referring particularly to Figs. 12, 13 and 14 I have illustrated a still further modified form of the invention in which the differential unit is constructed after the pattern of the planetary or sun-gear type of transmission. The driven shaft 10d may be supported in any suitable bearing members, not shown, similar to the bearing supports 58 and 59, as illustrated in the form of the invention shown in Fig. 11 and has freely rotatable thereon a flat disc pulley member 120, the outer periphery of which is grooved, as indicated at 121, to receive a double V-belt 122. Secured to the rear face of the disc pulley 120 is a cup-like member 123, also freely rotatable upon the shaft 10d, as by interposing a roller bearing 124 between the cup 123 and the shaft 10d. The cup-like member 123 is secured to the pulley disc 120 by means of a plurality of screws 125 so that by driving the pulley 120 the cup member 123 will likewise be driven at the same speed. Formed internally within the periphery of the cup-member 123 is an internal gear 126 adapted to mesh with a pinion 127 rotatably mounted upon an outstanding boss 128 formed upon a spider 129. A second pulley 130 is rotatably mounted upon the shaft 10d as by means of a ball bearing 131, the pulley 130 being adapted to receive a V-belt 132. The pulley 130 is keyed as indicated at 133 to a sleeve 134, the left-hand end of which, as viewed in Fig. 13, is enlarged to form a spur gear 135 also meshing with the pinion 127. The spider 129 is keyed, as indicated at 136, to the driven shaft 10d so that by driving the pulley 130 in one direction and driving the pulley 120 in the opposite direction, the pinion 127 will act upon the gears 126 and 135 in the same manner as the rollers 13 were acted upon by the pulleys D and E in the form of the invention shown in Figs. 1 through 8. That is, the spider 129 will be driven at a speed equaling one-half of the difference between the speed of operation of the pulleys 120 and 130.

Suitable pulleys may be provided upon the shaft of the motor with which the unit illustrated in Figs. 12 and 13 is employed to drive the pulleys 120 and 130 at the desired speeds.

As indicated in Fig. 13, the pulley 120 is of relatively large diameter compared to the pulley 130 though it will be understood by those skilled in the art that the diameter of the pulley 130 may be increased or decreased relative to the diameter of the pulley 120 to achieve the desired ratios between these two pulleys.

It will be particularly observed from an inspection of Figs. 12 and 13 that the unit illustrated therein is adapted for simple lubrication, since the cup-like member 123 assembled with the pulley disc 120 forms a hollow chamber 137 which may be filled with suitable oil, grease or other lubricant, and by employing ball bearings of the type shown in Fig. 14 as the ball bearings 124, 138 and 139, this chamber may be made substantially leakproof.

By referring particularly to Fig. 14 it will be observed that the top ball bearing 139 illustrated therein includes the ball races 140 and 141 engaging the balls 142. Interposed between the ball races 140 and 141 on both sides of the balls 142, are washer assemblies including a packing member 143 made of felt or other material which will form a seal between the two ball races.

In the form of the device shown in Figs. 12 and 13, I have shown the spider as being provided with two pinions 127 located at diametrically opposite sides of the driven shaft 10d, though it will be understood by those skilled in the art that if desired a single pinion 127 may be employed with this form of the device without serious unbalancing of the unit.

While I have shown and described the preferred embodiment of my invention, it is to be understood that I do not wish to be limited to any of the details of construction shown herein, except as defined in the appended claims.

I claim:

1. In a speed changing system, a differential unit, including a pair of rotary members, an intermediate member interposed between said rotary members and one or more rollers carried by said intermediate member interengaging both of said rotary members, a drive shaft, a pair of variable diameter pulleys on said drive shaft, a belt coupling one of said differential unit members to one of said pulleys for driven movement in the same direction as said pulley, another belt coupling the other of said pulleys to another of said differential members to drive the same in the opposite direction, a driven shaft connected to the third differential element, and means for simultaneously varying the diameters of said pulleys inversely relative to each other to vary the speed of said driven shaft without variation of speed of said drive shaft.

2. In a speed changing system, a differential unit, including a pair of rotary members, an intermediate member interposed between said rotary members and one or more rollers carried by said intermediate member interengaging both of said rotary members, a drive shaft, a pair of cone disc pulleys on said drive shaft, a belt coupling one of said differential unit members to one of said pulleys for driven movement in the same direction as said pulley, another belt coupling another of said pulleys to another of said differential members to drive the same in the opposite direction, a driven shaft connected to the third differential element, and means for simultaneously varying the effective diameters of said cone pulleys inversely relative to each other.

3. In a speed changing system, a differential unit, including a pair of rotary members, an intermediate member interposed between said rotary members and one or more rollers carried by said intermediate member interengaging both of said rotary members, a drive shaft, a pair of cone disc pulleys on said drive shaft having a cone disc common to both pulleys, a belt coupling one of said differential unit members to one of said pulleys for driven movement in the same direction as said pulley, another belt coupling the other of said pulleys to another of said differential members to drive the same in the opposite direction, a driven shaft connected to the third differential element, and means for shifting said common cone disc longitudinally of said drive shaft to simultaneously vary the effective diameters of said pulleys inversely relative to each other.

4. In a speed changing system, a differential unit, including a pair of rotary members, an intermediate member interposed between said rotary members and one or more rollers carried by said intermediate member interengaging both of said rotary members, a drive shaft, means mounting said differential unit spaced to one side of said drive shaft, a pair of variable diameter pulleys on said drive shaft, a pair of idlers mounted in spaced relation to said drive shaft upon the opposite side thereof, a belt directly coupling one of said differential members to one of said pulleys for driven movement in the same direction as said pulley, another belt extending from the other of said pulleys over said idlers, and another of said differential members to drive the same in the opposite direction, a driven shaft connected to the third of said differential members to be driven thereby, and means for simultaneously varying the diameters of said pulleys inversely relative to each other to vary the speed of said driven shaft.

5. In a speed changing system, a differential unit, including a pair of rotary members, an intermediate member interposed between said rotary members and one or more rollers carried by said intermediate member interengaging both of said rotary members, a drive shaft, means mounting said differential unit spaced to one side of said drive shaft, a pair of cone disc pulleys on said drive shaft having a cone disc common to both of said pulleys shiftable along the length of said shaft, a pair of idlers mounted in spaced relation to said drive shaft upon the opposite side thereof, a belt directly coupling one of said differential members to one of said pulleys for driven movement in the same direction as said pulley, another belt extending from the other of said pulleys over said idlers and another of said differential members to drive the same in the opposite direction, a driven shaft connected to the third of said differential members to be driven thereby, and means for simultaneously tightening one of said belts and loosening the other thereof for varying the effective diameters of said pulleys and inversely relative to each other to vary the speed of said driven shaft.

6. In a speed changing system, a differential unit, including a pair of rotary members, an intermediate member interposed between said rotary members and one or more rollers carried by said intermediate member interengaging both of said rotary members, a drive shaft, means mounting said differential unit spaced to one side of said drive shaft, a pair of variable diameter pulleys on said drive shaft, a pair of idlers mounted in spaced relation to said drive shaft upon the opposite side thereof, a belt directly coupling one of said differential members to one of said pulleys for driven movement in the same direction as said pulley, another belt extending from the other of said pulleys over said idlers, and another of said differential members to drive the same in the opposite direction, a driven shaft connected to the third of said differential members to be driven thereby, and means for shifting said driven shaft toward and away from said differential unit to simultaneously vary the effective diameters of said cone inversely relative to each other to vary the speed of said driven shaft.

HERBERT E. TWOMLEY.